No. 651,952. Patented June 19, 1900.
A. PEARLSTINE.
COMBINED FLASK AND HEATER.
(Application filed Feb. 16, 1900.)
(No Model.)
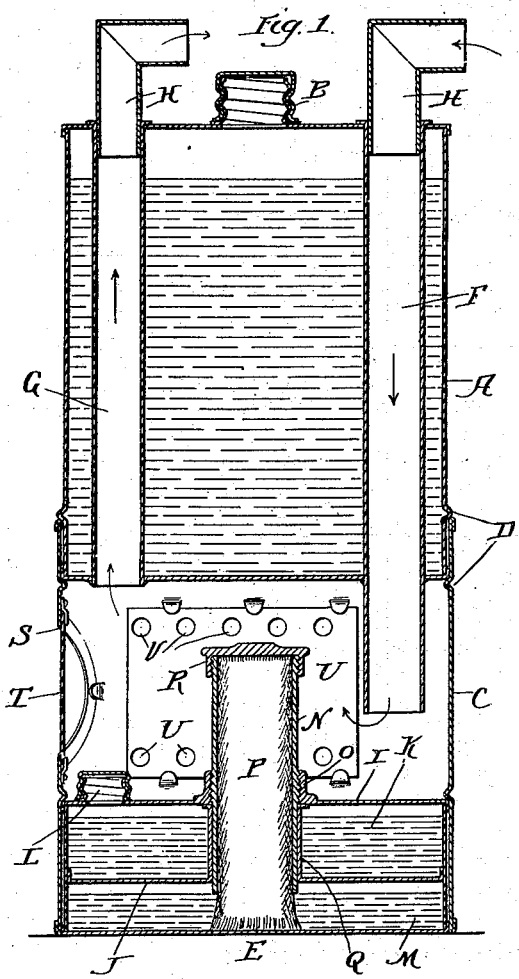
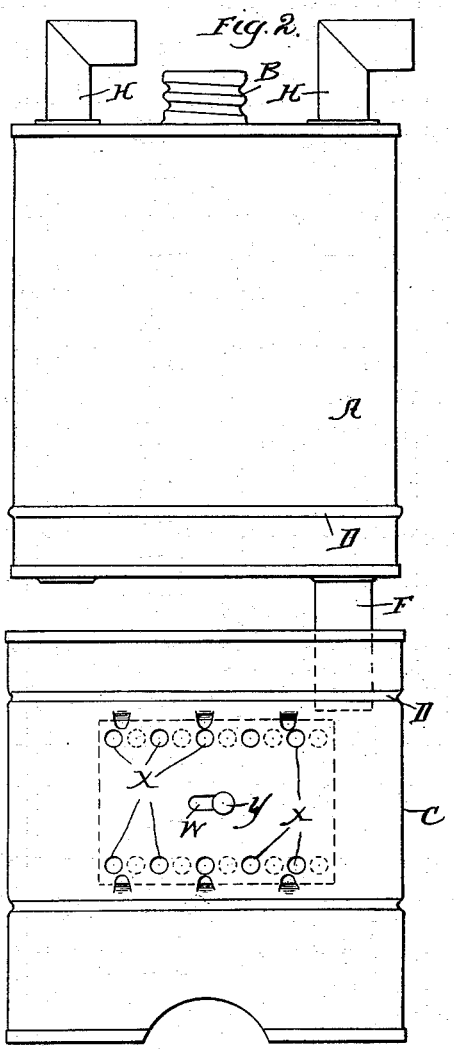
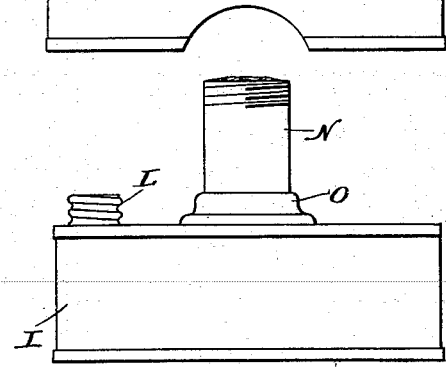
Witnesses:
H. B. Hallock.
E. H. Forsyth.
Inventor:
Abraham Pearlstine
By Geo. E. Hazelton
Atty.
THE NORRIS PETERS CO., PHOTO-LITHO., WASHINGTON, D. C.

UNITED STATES PATENT OFFICE.

ABRAHAM PEARLSTINE, OF PHILADELPHIA, PENNSYLVANIA.

COMBINED FLASK AND HEATER.

SPECIFICATION forming part of Letters Patent No. 651,952, dated June 19, 1900.

Application filed February 16, 1900. Serial No. 5,470. (No model.)

*To all whom it may concern:*

Be it known that I, ABRAHAM PEARLSTINE, a citizen of the United States, residing at Philadelphia, in the county of Philadelphia and State of Pennsylvania, have invented a certain new and useful Improvement in a Combined Flask and Heater, of which the following is a specification.

My invention relates to a new and useful improvement in a combined flask and heater, and has for its object to provide a flask which can be used separate from the heating attachment, the same as those now in use, or can be readily attached to the heating device and then can be set aside for a few minutes or placed in the owner's pocket, and the coffee or other liquid contained therein will be heated without any further attention from the user, thus enabling working people to heat their coffee while they are working, and thereby having it in readiness to drink at mealtime, and this is especially advantageous to working people, such as motormen and conductors, working outside in cold weather, it often being necessary for them to occasionally have a hot drink during working hours, and as my device can be carried in the pocket while heating the beverage it is always ready for use.
Another object of my device is that upon removing the flask the heating attachment can be used for heating other articles of food.

With these ends in view the invention consists in the details of construction and combination of elements hereinafter set forth, and then specifically designated by the claims.

In order that those skilled in the art to which this invention appertains may understand how to make and use the same, the construction and operation will now be described in detail, referring to the accompanying drawings, forming a part of this specification, in which—

Figure 1 is a longitudinal section of my improved device, showing the parts all assembled; Fig. 2, a side view of my device, showing the different parts removed from one another; and Fig. 3, a horizontal section through the flask.
In carrying out my invention as here embodied, A represents a flask for holding the liquid to be heated.

B is a screw top covering the opening through which the flask is filled.

C is the heating-compartment, which is made in the same general outline as the flask A, and the flask A is adapted to be inserted a short way within this compartment and rest upon the stops D, formed in the flask A and the compartment C. An alcohol-lamp or other heating device E is inserted in the lower end of the heating-compartment C, thus furnishing means for heating the flask A.

It is obvious that for the proper burning of the lamp E air should be supplied to the heating-compartment C. For this purpose I provide an air-duct F, which extends from the outside of the top of the flask downward through and a slight distance below the bottom of the same into the heating-compartment C. At the opposite side of the flask I provide a heat-flue G, which extends upward from the heating-chamber C through the flask to the outside of the top of the same. This heat-flue is for the purpose of carrying off the excess heat and also for the purpose of radiating it through the liquid. Elbows H H are provided, if necessary, at the top of the flask and adapted to be inserted within the air-duct F and the heat-flue G and turned with their mouths pointing in the opposite direction from which the wind is blowing if the flask is in an exposed position, thereby preventing the possibility of the lamp being blown out.

To avoid the possibility of the lamp or heater E becoming overheated, I divide the reservoir I into two compartments by means of the horizontal partition J. The upper compartment K is adapted to be filled with water or other cooling liquid, a screw-cap and opening L being provided for filling this compartment. The lower compartment M contains the alcohol or other combustible fluid. A tube N extends from the outside of the reservoir into the said lower compartment M. This tube N is adapted to be removed for the purpose of filling the lower compartment M by unscrewing it from out of the flange O, secured upon the top of the reservoir. Extending through this tube is a wick P. A tubular piece Q extends upward from the partition J and has a water-tight connection with the top of the reservoir I, thereby preventing the cooling liquid from flowing into the lower compartment M. The tube N passes through this tubular portion Q in passing to the lower compartment M. A cap R may be secured upon the top of the tube N when the apparatus is not being used, thereby preventing any evaporation of the burning fluid.

An opening S is provided in the heating-compartment C, covered by suitable transparent material, such as isinglass, T, for the purpose of observing the burning of the lamp.

When it is desired to heat other articles of food, the flask A is removed from the heating-compartment C and the articles to be heated are placed across the top of this heating-compartment, thus furnishing a satisfactory stove. Of course upon removing the flask A the air-duct F is removed therewith, and in using the heating-compartment C for heating other articles it would be necessary to furnish air thereto by other means. For this I provide a sliding ventilator U, this ventilator having therein a series of holes V, which when slid in one direction are adapted to register with the series of holes X provided through the wall of the heating-compartment C. A slot W in the wall of the heating-compartment C, and the knob Y, secured to the sliding ventilator U and extending through the slot, furnish means for the sliding of this ventilator.

When this apparatus is being used to heat the flask, the holes V will be moved out of register with the holes X.

The advantages of my improvement are obvious in that after the lamp is lighted it can be readily carried within the coat-pocket or put away in some convenient place until the liquid contained in the flask is heated, and, if desired, the flask can be kept filled all day, thereby insuring the owner a hot drink at any time, this being a great convenience to people required to work outside in cold weather.

Having thus fully described my invention, what I claim as new and useful is—

1. In a combined flask and heater, a flask, a heating-compartment into which a portion of the flask is adapted to be inserted, a heating device adapted to be inserted within the heating-compartment, an air-duct extending from the outside of the flask downward through the same communicating with the heating-compartment, a heat-flue extending from the heating-compartment upward through the flask to the outside of the same, removable revoluble elbows adapted to be inserted within said air-duct and heat-flue, and a sliding ventilator located within the sides of the heating-compartment, as specified.

2. In a combined flask and heater, a flask, a heating-compartment into which a portion of the flask is adapted to be inserted and rest upon stops suitably placed, an air-duct extending vertically through the flask and communicating with the heating-compartment, a vertical heat-flue passing from the heating-compartment through the flask, removable revoluble elbows adapted to be inserted within the upper ends of the air-duct and heat-flue, and a slidable ventilator located within the sides of the heating-compartment, as and for the purpose set forth.

In testimony whereof I have hereunto affixed my signature in the presence of two subscribing witnesses.

ABRAHAM PEARLSTINE.

Witnesses:
GEO. C. HAZELTON, Jr.,
H. B. HALLOCK.